April 8, 1958 T. D. ERNST ET AL 2,829,671
REINFORCED HOSE
Filed July 15, 1954 2 Sheets-Sheet 1
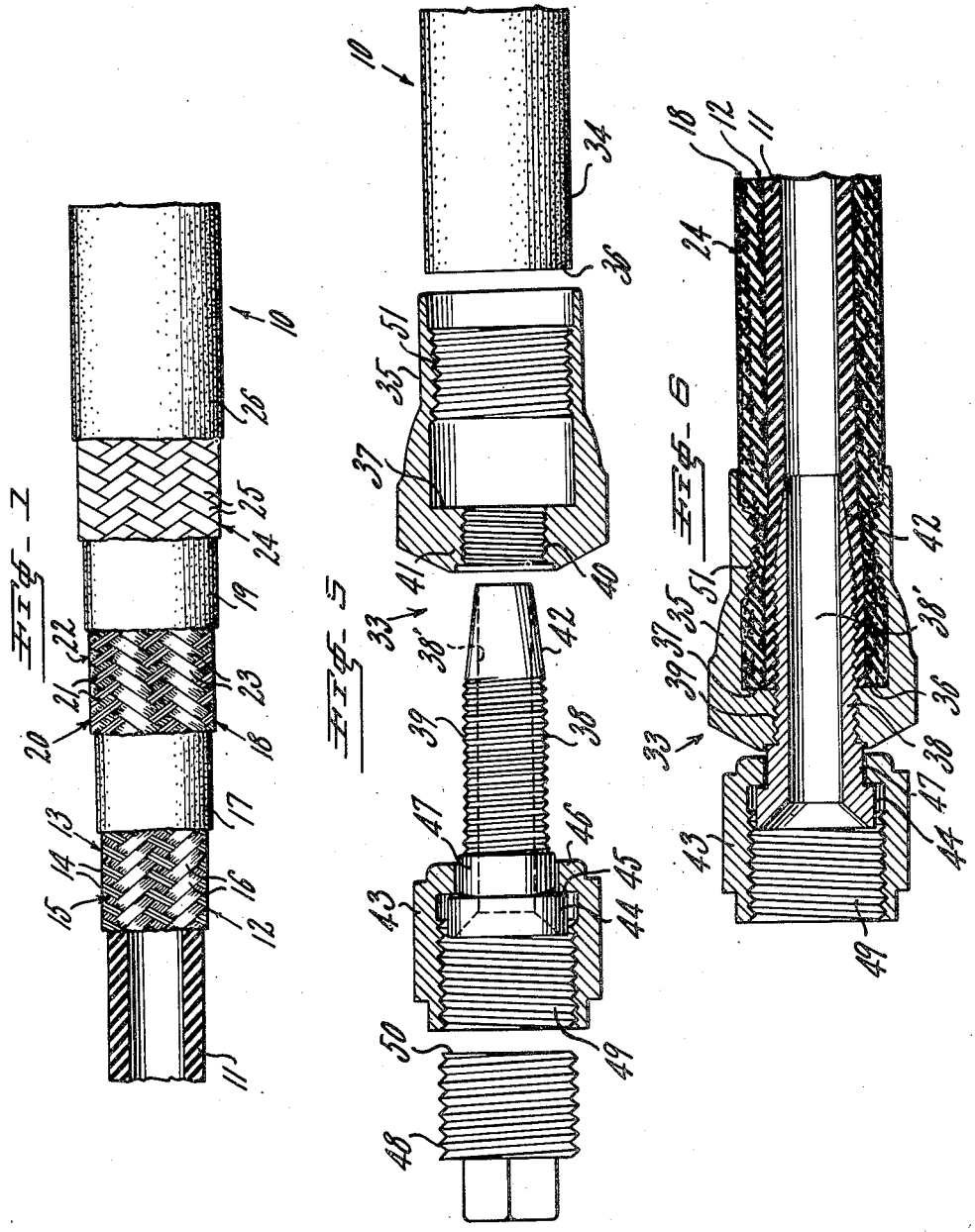
INVENTORS
THEODORE D. ERNST
DANTE E. PICCOLI
BY
*William R. Epes*
ATTORNEY

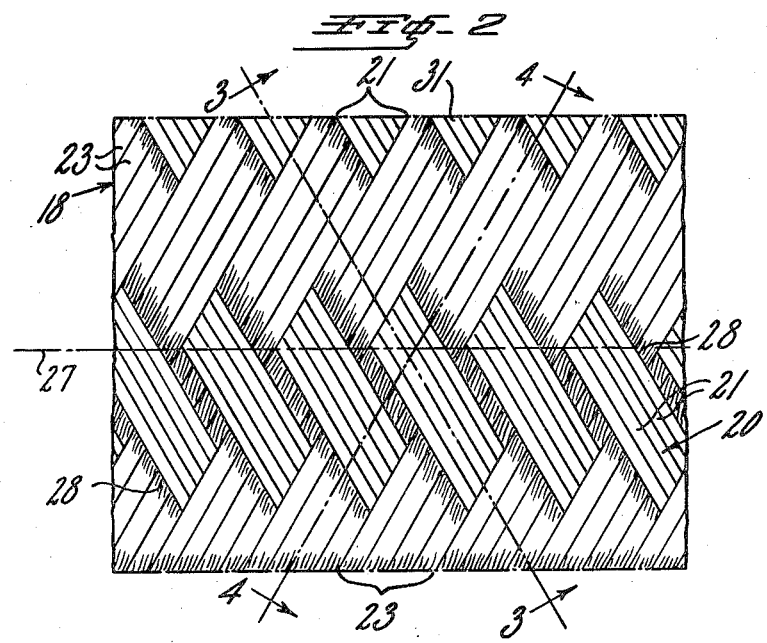
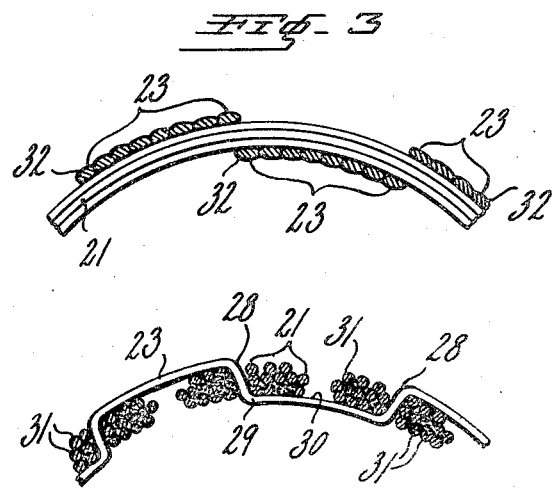

United States Patent Office 2,829,671
Patented Apr. 8, 1958

2,829,671
REINFORCED HOSE

Theodore D. Ernst, Towaco, N. J., and Dante E. Piccoli, New York, N. Y., assignors to United States Rubber Company, New York, N. Y., a corporation of New Jersey Application July 15, 1954, Serial No. 443,552

8 Claims. (Cl. 138—25)

This invention relates to an improved hose for conveying or containing fluids under high pressure and to the combination of the hose and a coupling therefor adapted to form a strong leak-proof connection between the ends of the hose and the couplings.

This invention relates particularly to the reinforcing construction of the hose comprising at least two braided tubes, each tube consisting of a helical course of relatively stiff high tensile strength webs, which are free from crimps and are braided with and are wound in the opposite direction to a helical course of relatively flexible webs, which are crimped at the stitches where they pass in and out between the webs of the high tensile course. In such construction, the high tensile webs in the adjacent tubes are wound in opposite directions, so as to balance the capacities of such helically wound webs to unwind. In this improved construction the high tensile webs carry the pressure load and the flexible webs merely bind or tie in the high tensile webs. Such high tensile and flexible webs are hereinafter referred to respectively as load carrying and tie-in-webs.

Heretofore, hose for conveying or containing fluids under high pressure have been reinforced with braided tubes in which both of the helical courses in each tube were made of similar high tensile wire, and the webs in both courses were load carrying members. When the webs of wire of one course were braided with the webs of the other course, the wires in each course were crimped at the stitches, where the webs of one course passed in and out between the webs of the opposite course. Such crimps reduced the load carrying capacity of the webs, which resulted in a reduction in the bursting strength of the hose. Such crimps also caused the reinforcing wires to flex when the hose was subjected to surges of internal pressure. The repeated pressure impulses produced flexure or so-called impulse fatigue in the wires which have caused them to rupture.

High tensile wires used in hose construction are relatively stiff, and when they were braided in accordance with the foregoing conventional construction, they formed a relatively stiff tube, because of the interlocked connection between the intermeshed stiff wires which was produced by the crimps in the webs of both courses. Such stiff braided tube imparted undesirable stiffness to the hose.

In the conventional construction, the wire strands of each web were laid side-by-side in a single layer in the helical webs. This limited the number of wire strands per unit width of web, and in order to off-set this limitation, the wires of each web were packed tightly and the webs also were braided tightly together to obtain the maximum density of reinforcing material. Such tightly packed and braided wires further increased the stiffness of the braided tube.

In accordance with the present invention, greater bursting strength and greater resistance to impulse fatigue is imparted to the hose by eliminating crimps in the load carrying high tensile strands of reinforcing braid. This is accomplished by braiding the relatively stiff high tensile course of webs with relatively flexible webs in the companion, or oppositely wound course, which takes all of the crimp at the stitches, and relieves the high tensile strands of any crimping.

Such improved construction has greater flexibility than the prior conventional wire braid construction, because the relatively stiff high tensile webs are not braided together or interlocked with each other by crimps in each of the braided tubes.

The strength of this improved hose is further increased because the strands of the high tensile webs of the braid can be bunched by virtue of the fact that the flexible webs in the companion course takes all of the crimp, and permits the high tensile strands to be bunched and thereby obtain a greater number for each course of high tensile webs.

This improved construction also has the further advantage of permitting larger diameters of wires to be used in the larger diameter hose without increasing the thickness or stiffness of the braid to the extent that would be caused in the prior conventional construction.

The hose embodying this invention has the further advantage in that the helical courses of high tensile webs in the adjacent tubes are wound in opposite directions, and thereby balances the unwinding effect of one against the other under the internal fluid pressure of the hose, and such oppositely wound arrangement of the high tensile webs in combination with the tie-in-webs facilitate the production of a strong leak-proof connection between the ends of the hose and the coupling therefor.

The invention, its objects and advantages are further described in reference to the accompanying drawings, in which:

Fig. 1 is a side elevational view of a section of a hose embodying this invention in its preferred form, and showing a part in section and other parts broken away for clearness of illustration;

Fig. 2 is an enlarged top plan view of one quarter of the arc of the outer braided reinforcing tube shown at the center of Fig. 1;

Fig. 3 is a diagonal cross-sectional view of the braid shown in Fig. 2, taken on line 3—3;

Fig. 4 is a diagonal cross-sectional view of the braid taken on line 4—4 of Fig. 2;

Fig. 5 is a side elevational view of an end of the hose embodying this invention, and an exploded view of the coupling therefor, showing parts of the coupling in cross-section for the purpose of illustrating the method of assembling the coupling onto the end of the hose; and Fig. 6 is a side elevational view of the assembled coupling and hose, in which all parts are shown in longitudinal cross-section.

Referring to Fig. 1, the hose 10 comprises an internal tube, or lining 11 of a suitable elastomeric material, such as rubber, or plastic, which is surrounded by a reinforcing braided tube 12 consisting of a helical course 13 of relatively stiff high tensile strength webs 14, which are braided with a reversely wound helical course 15 of relatively flexible webs 16. A layer 17 of elastomeric material is applied over and bonded to the reinforcing inner braided tube 12. An outer reinforcing braided tube 18 surrounds the layer 17, and a layer 19 of elastomeric material similar to the layer 17 is applied over the tube 18 and bonded thereto. The reinforcing tube 18 is identical to the reinforcing braided tube 12, excepting the tube 18 has a larger diameter and its helical course 20 of relatively stiff high tensile webs 21 and its companion helical course 22 of relatively flexible webs 23 are wound, respectively, in reverse directions to the corresponding stiff and flexible webs of the inner braided reinforcing tube 12. The high tensile webs 14 and 21 carry the pressure load in the hose, and such load carrying webs 14 and 21 of the individual tubes 12 and 18 are wound in reverse directions to balance the unwinding force of webs 14 against the unwinding force of webs 21 when the hose is subjected to internal pressure. The flexible webs 16 and 22 merely tie the load carrying webs 14 and 21 in place. Such tie-in-webs are relatively weak and have a smaller cross-section than the load carrying webs. A protective braided tube 24 of webs 25, such as cotton or wire, surrounds the coating 19. The protective braid 24 may be protected against abrasion and moisture with an elastomeric coating 26.

It is preferred that the load carrying webs 14 and 21 of the reinforcing tubes 12 and 18 be made of high tensile, low elongation untwisted strands of wire, and that the tie-in-webs 16 and 23 be made of cotton yarns. However, other suitable load carrying and tie-in-webs may be used. It is also preferred that the braided construction be in the form of a regular braid, in which the webs of one course passes over and under two webs of the companion course of the braid. The details of such braided construction made of cotton and high tensile wire webs are illustrated in enlarged Figs. 2, 3 and 4. Fig. 2 is an enlargement of a 90° arc of the surface of the outer reinforcing braid 18 shown in Fig. 1, and in which the dot and dash line 27 is the axis of the tube. It will be noted in Fig. 3 that the load carrying webs 21 extend to a smooth helix around the tube 18, and such webs are free from crimps, and that the flexible tie-in cotton webs 23, as shown in Fig. 4 take all of the crimp. Such cotton webs 23 are sharply crimped, or bent at the stitches 28, where the webs 23 pass in and out between the load carrying webs 21. The crimps 29 in the flexible cotton webs are sufficiently deep to provide a trough 30 of a depth substantially equal to the diametrical thickness of the load carrying webs 21 which are composed of a plurality of high tensile wires 31 arranged in groups or bunches, in which the several strands of wire 31 are piled one on another in several layers at different distances from the axis of the tube 18.

The cotton webs 23 are composed of a plurality of twisted cotton yarns 32 which lie generally side by side in single layer to reduce the thickness of the braid and to provide more surface space for the load carrying webs. In order to provide sufficient strength for the cotton webs 23 to bind the wire webs 21 together, a sufficient number of cotton yarns of a suitable gauge are used in each web, but the entire cross-section of the tie-in-webs 23 are considerably less than the entire cross-section of the load carrying webs 21.

By way of example and without limiting this invention the following is given as a suitable specification of a reinforcing braided construction for two different size hose:

EXAMPLE A

5/16 inch inside diameter hose 12 load carrying webs each containing 9 strands of brass coated high tensile wire having a tensile range of from 300,000 to 350,000 p. s. i.; each strand having a diameter of .012 in.

12 tie-in-webs each containing 4 twisted cotton yarns; each yarn having a diameter of .0245 in.

EXAMPLE B

7/8 inch inside diameter hose 18 load carrying webs, each containing 12 wire strands of brass coated high tensile wire having a tensile range of from 300,000 to 350,000 p. s. i.; each strand having a diameter of .015 in.

18 tie-in-webs, each containing 4 twisted cotton yarns; each yarn having a diameter of .024 in.

In the manufacture of the hose 10, the internal tube or liner 11 is preferably made of natural or synthetic rubber, but it may be made of other suitable flexible plastic materials. "Teflon" is an example of a suitable plastic liner material. As shown herein the liner 11 is made of neoprene rubber, and the other elements of the hose are built up on the lining while it is in the uncured or semi-cured state. The tube 12 is braided over the liner 11 with the use of a conventional braiding machine. The wires 31 used in the braid are brass plated to increase the strength of the bond between the wire and the rubber in contact therewith. A coating of a liquid neoprene dough is applied over the braided tube 12 to form the layer 17, which is dried before the braided tube 18 is applied in the same manner as the inner reinforcing braided tube 12. The outer layer 19 is applied over the braid 18 and dried in the same manner as the inner separating layer 17. The layers 17 and 19 may be made of calendered strips of natural or synthetic rubber, which may be laid in between the braids 12—18 and 18—24 during the braiding operation on the conventional braiding machine. The cotton braid 25 and outer rubber coating 26 are applied in any conventional manner. After the hose has been so built up, the rubber portions of the hose are vulcanized in the usual manner. After vulcanization the inner braided tube 12 is firmly bonded to the liner 11 and the intermediate layers of rubber firmly bond the adjacent layers of braid together.

The completed hose 10 is then cut to the desired length, and the coupling 33 shown in Figs. 5 and 6 affixed to the ends of the hose. As indicated in the exploded view of the coupling 33 shown in Fig. 5, it is assembled on the end 34 of the hose by screwing the body 35 over the outer surface of the end 34 until the end wall 36 of the hose 10 abuts against the internal abutment 37 of the coupling body 35. Then an inner coupling member 38 provided with an internal fluid passage 38' and external threads 39 is screwed into the inner annular thread 40 of the reduced bore in the head 41 of the body 35. The inner member 38 is provided with a tapered end 42 which fits into the hose liner 11 as shown in Fig. 6. When the member 38 is screwed into the body 35, the inside diameter of the hose end 34 is expanded and the walls of the hose 10 are clamped between the inner member and the outer body 35 to form a strong leak-proof connection between the coupling 33 and the hose 10. The inner member 38 is provided with the usual gland nut 43 for connecting the hose to a high pressure fluid line. Before this inner member 38 is screwed into the body 35, the tapered end 42 of the inner member 38 is extended through the gland nut 43 until its head 44 abuts against the shoulder 45 on the reduced end of the gland nut 43. The reduced end 46 of the gland nut 43 is swiveled on the neck 47 of the inner member 38.

In order that the inner member 38 may be screwed into the coupling body 35, a plug 48 is screwed into the hose coupling threads 49 of the gland nut 43 until the inner end 50 of the plug 48 is forced against the head 44 of the inner member 38. The inner member 38 is thereby rigidly affixed to the gland nut 43, which may be turned with a wrench so as to screw the inner member 38 into the coupling body 35. When this is done the coupling 33 is affixed to the hose 10 as shown in Fig. 6, and the plug 48 is then unscrewed from the gland nut 43.

For the purpose of producing a strong leak-proof connection between the hose coupling 33 and the end of the hose 34, the thread 39 on the inner member 38 is cut to wind in the opposite direction to the helical winding of the reinforcing webs 14 of the inner reinforcing tube 12, so that when the inner member 38 is screwed into the coupling body 35, it will be rotated in the direction of the helical winding of the reinforcing webs 14 on the inner reinforcing braided tube 12, and thereby tighten the helical winding of such webs, and also tighten the winding of the reinforcing webs 21 of the outer braided tube. Similarly in order to prevent the reinforcing webs 21 of the outer braided tube 18 from being unwound when the coupling body 35 is screwed thereon, the helical winding of the threads 51 in the larger bore of the body is made so that it winds in the opposite direction to the winding of the webs 21. Otherwise, when the direction of windings of the reinforcing webs 14 and the threads 39 are in the same direction, sometimes the webs 14 and 21 are unwound or disarranged in the hose 10, whereby the walls of the hose end 34 are broken down and a weak leaky connection is formed. The disarrangement of the load carrying webs in the coupling joint is also resisted by the tie-in-webs, and the latter assist in the formation of a strong leak-proof joint. In the Examples A and B of braid constructions set forth previously herein it was found that less than three cotton yarns per web resulted in leaky or weak coupling connections. The number and size of the yarns in the tie-in-webs will be determined by the particular construction and desired function of the hose.

While the preferred form of this invention has been described more or less in detail, it will be understood that changes in the construction may be made without departing from the spirit of this invention, and it is intended to cover such changes in the appended claims.

Having thus described our invention, what we claim and desire to protect by Letters Patent is:

1. A flexible hose comprising a liner, at least two reinforcing braided tubes, one within the other and each surrounding said liner, each of said braided tubes having a helical course consisting essentially of relatively stiff high tensile strength webs braided with an oppositely wound helical course composed of relatively flexible webs, said high tensile helical webs being composed of substantially parallel strands free from crimps, and said high tensile helical webs in the separate said tubes being wound in opposite directions about the axis of said hose.

2. A hose comprising a liner, at least two reinforcing braided tubes, one within the other and each surrounding said liner, each of said braided tubes having a helical course of load carrying webs braided with a course of tie-in-webs, said load carrying webs being composed of substantially parallel strands which are free from crimps and extend in a smooth helical path around the axis of said tubes, said tie-in-webs having crimps therein where they pass in and out between said load carrying webs, and said courses of tie-in-webs in the adjacent individual braided tubes being wound in opposite directions about the axis of said tubes.

3. A flexible hose comprising a liner of elastomeric material, a reinforcing braided tube surrounding said liner and bonded thereto, a second reinforcing braided tube surrounding said first tube, a layer of elastomeric material interposed between said first and second reinforcing tubes and bonding said tubes together, each of said reinforcing tubes comprising a helical course of load carrying webs which are braided with a helical course of tie-in-webs, said load carrying webs being free from crimps and said tie-in-webs having crimps therein where they pass in and out between said load carrying webs, and the helical winding of said course of load carrying webs in said first tube extending in the reverse direction to said helical winding of said course of load carrying webs in said second tube.

4. A flexible hose comprising an elastomeric liner, at least two reinforcing braided tubes surrounding said liner, each of said tubes comprising a helical course of high tensile wire webs which are braided with a reversely wound course of relatively flexible fibrous webs, said wire webs being free from crimps and said fibrous webs having crimps therein where they pass in and out between said high tensile wire webs, and the winding of said helical course of wire webs in one tube extending in the reverse direction to the winding of said wire webs of the adjacent tube.

5. A flexible hose comprising a liner, at least two reinforcing braided tubes, one within the other and each surrounding said liner, each of said braided tubes having a helical course of relatively stiff high tensile strength webs braided with an oppositely wound helical course of relatively flexible webs, each of said stiff webs being free from crimps and comprising a plurality of strands bunched together at different distances from the axis of said tubes, and said flexible webs being crimped to form a trough substantially as deep as the thickness of said webs.

6. A flexible hose comprising a liner, a reinforcing braided tube surrounding said liner, a second reinforcing braided tube surrounding said first tube, each of said reinforcing tubes comprising a helical course of load carrying webs which are braided with a helical course of tie-in-webs, said course of load carrying webs in one of said tubes being wound in the reverse direction to said course of load carrying webs of the other tube, said load carrying webs extending in a smooth helical path around the axis of said tubes, said tie-in-webs extending in a helical path around the axis of said tubes and having crimps therein where they pass in and out between the load carrying webs, said load carrying webs comprising a plurality of strands bunched together in a plurality of layers.

7. The combination of a flexible hose and a coupling therefor, said hose comprising a liner, an inner and an outer reinforcing braided tube surrounding said liner, each of said reinforcing tubes comprising a helical course of high tensile wire load carrying webs which are braided with a helical course of textile tie-in-webs, said course of load carrying webs in said inner tube being helically wound in the reverse direction to said helical course of load carrying webs in said outer tube, said coupling comprising an outer body having an internal bore adapted to receive an end of said hose, an inner coupling member having a fluid passage therein, said inner member having external screw threads which are threaded into a reduced axial bore in said body whereby the walls of said hose are clamped between said body and said inner member, and said threads on said inner member being formed to wind in the reverse direction to the winding of said load carrying webs in said inner braided tube.

8. The combination of a flexible hose and a coupling therefor, said hose comprising a liner, an inner and an outer reinforcing braided tube surrounding said liner, each of said reinforcing tubes comprising a helical course of high tensile wire load carrying webs which are braided with a helical course of textile tie-in-webs, said course of load carrying webs in said inner tube being helically wound in the reverse direction to said helical course of load carrying webs in said outer tube, said coupling comprising an outer body having an internal bore adapted to receive an end of said hose, said bore having internal screw threads which are screwed onto said end of said hose, said threads winding in the reverse direction to said load carrying webs in said outer braided tube, an inner coupling member having a fluid passage therein, said inner member having external screw threads which are threaded into a reduced axial bore in said body whereby the walls of said hose are clamped between said body and said inner member, and said threads on said inner member being formed to wind in the reverse direction to the winding of said load carrying webs in said inner braided tube.

References Cited in the file of this patent

UNITED STATES PATENTS

| 417,796 | Taft | Dec. 24, 1889 |
| 910,770 | Armstrong | Jan. 26, 1909 |
| 1,726,957 | Hughes | Sept. 3, 1929 |
| 1,736,106 | Williamson | Nov. 19, 1929 |
| 1,775,334 | Wanamaker | Sept. 9, 1930 |
| 2,151,307 | Smith | Mar. 21, 1939 |
| 2,551,038 | Nebout | May 1, 1951 |
| 2,577,049 | Uline | Dec. 4, 1951 |

FOREIGN PATENTS

| 344,468 | Great Britain | Feb. 24, 1931 |